US012135027B2

(12) United States Patent
Klotten et al.

(10) Patent No.: US 12,135,027 B2
(45) Date of Patent: Nov. 5, 2024

(54) SPIRAL COMPRESSOR WITH RUNNING SLEEVES LOCKED AXIALLY BUT ABLE TO ROTATE

(71) Applicant: Hanon Systems, Daejeon (KR)

(72) Inventors: Thomas Klotten, Cologne (DE); Dennis Kröcker, Overath (DE)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/549,758

(22) PCT Filed: May 17, 2022

(86) PCT No.: PCT/KR2022/007019
§ 371 (c)(1),
(2) Date: Sep. 8, 2023

(87) PCT Pub. No.: WO2022/250359
PCT Pub. Date: Dec. 1, 2022

(65) Prior Publication Data

US 2024/0159237 A1 May 16, 2024

(30) Foreign Application Priority Data

May 27, 2021 (DE) ........................ 10 2021 113 731

(51) Int. Cl.
*F04C 18/02* (2006.01)
*F04C 29/00* (2006.01)

(52) U.S. Cl.
CPC ...... *F04C 18/0215* (2013.01); *F04C 29/0057* (2013.01); *F05C 2251/10* (2013.01)

(58) Field of Classification Search
CPC .............. F04C 18/0215; F04C 29/0057; F05C 2251/10
See application file for complete search history.

(56) References Cited

U.S. PATENT DOCUMENTS 10,208,749 B2 * 2/2019 Lim .................... F04C 18/0215
2014/0369819 A1 * 12/2014 Yamashita .......... F04C 18/0215
415/170.1

FOREIGN PATENT DOCUMENTS

CN 104160153 A 11/2014
DE 102019108417 A1 * 10/2020 .......... F04C 18/0215
(Continued)

OTHER PUBLICATIONS

Machine Translation and Foreign Patent Publication for German Patent DE 10 2019 206 544 A1: Inventor: Schmitt; Title: Electromotive Refrigerant Compressor; Published: Nov. 12, 2020 (Year: 2020).*
(Continued)

*Primary Examiner* — Mary A Davis
(74) *Attorney, Agent, or Firm* — Shumaker, Loop & Kendrick, LLP; James D. Miller

(57) ABSTRACT

A spiral compressor having a stationary spiral element with a stationary spiral wall, a rotating spiral element with a rotating spiral wall arranged on a rotatable plate which is engaged with the stationary spiral wall wherein several compression working spaces are formed, and a guide means intended for guiding the rotating spiral element and with at least two guiding pins arranged in a stationary manner, at least two recesses formed on a back of the rotating spiral element with running sleeves which are inserted therein in a radially movable manner, in which the guiding pins are received such that the inner surface of the running sleeves, during rotation of the rotating spiral element, rotates about the circumference of the guiding pins, and wherein a lock is formed in every recess which prevents an axial protrusion of the running sleeves out of the recesses.

10 Claims, 3 Drawing Sheets

(56) References Cited

FOREIGN PATENT DOCUMENTS

| | | | |
|---|---|---|---|
| JP | 2003328962 | A | 11/2003 |
| JP | 2006183527 | A | 7/2006 |
| KR | 1001952374 | B1 | 2/2019 |
| KR | 20200045325 | A | 5/2020 |
| WO | 2013152706 | A1 | 10/2013 |

OTHER PUBLICATIONS

Machine Translation and Foreign Patent Publication for German Patent Publication DE 11 2017 004 928 T5; Inventor: Hashimoto; Title: Scroll Compressor and Method for Producing A Scroll Compressor; Published: Jun. 13, 2019. (Year: 2019).*

Machine Translation and Foreign Patent Publication for Korean Patent Publication KR 10-2020-0045325; First Inventor: Taesang; Title: Morot Operated Compressor; Published: May 4, 2020. (Year: 2020).*

* cited by examiner

SPIRAL COMPRESSOR WITH RUNNING SLEEVES LOCKED AXIALLY BUT ABLE TO ROTATE

CROSS REFERENCE TO RELATED PATENT APPLICATIONS

This is a U.S. national phase patent application of PCT/KR2022/007019 filed May 17, 2022 which claims the benefit of and priority to German Patent Application No. 10 2021 113 731.4 filed on May 27, 2021, the entire contents of each of which are incorporated herein by reference.

TECHNICAL FIELD

The invention relates to a spiral compressor.

BACKGROUND ART

Spiral compressors, which are also known under the name scroll compressors, are employed as compressors preferably in cold machines and in heat pumps as they can be mass-produced in an inexpensive manner and have a low noise development in operation compared to reciprocating compressors. The conveying effect of spiral compressors is substantially based on two interlocking spiral walls, wherein one of them is stationary and the other one is eccentrically moved on a circular path. Several compression working spaces are formed between the interlocking spiral walls through the eccentric movement of a rotating spiral element on which the rotating spiral wall is arranged.

In spiral compressors of known design, recesses with running sleeves inserted therein are formed on the back of the rotating spiral element, referred to as orbiting pockets, which are received by guiding pins arranged in a stationary manner, which are also referred to as orbiting pins. At a movement of the rotating spiral element, the running sleeves, which are also referred to as orbiting rings, rotate about the outer surface of the guiding pins, such that radial forces, which are caused during the compressor operation due to the eccentric movement of the rotating spiral element, can be received. In doing so, the running sleeves protect the inner surface of the recesses from increased abrasion.

The arrangement of the guiding pins arranged in a stationary manner and the recesses of the rotating spiral element with the running sleeves inserted therein, in which the guiding pins are received, can be understood as a guide means for the radial guidance of the rotating spiral element.

Up to now, running sleeves have been used which have a radial clearance and an axial clearance in the recesses, such that a radial and an axial movability of the running sleeves in the recesses is given during compressor operation. However, it has also been shown that in particular the axial clearance has a detrimental effect on construction elements which are axially adjacent to the back of the rotating spiral element, as the running sleeves can axially protrude out of the recesses during operation due to vibrations and thus cause an increased abrasion through end face friction on the adjacent construction elements. Therefore, for the spiral compressors known up to now, the construction element adjacent to the back of the rotating spiral element, which is a disc-shaped sealing element for sealing the back of the rotating spiral element against a housing body, is provided with an increased material hardness. Due to the increased material hardness of the disc-shaped sealing element, which is also referred to as a wearplate, the material abrasion on the surface of the disc-shaped sealing element facing the back of the rotating spiral element can be reduced, which decreases the danger of early storage damages and/or a blockage of the nozzles of the counterpressure system. However, the required increased degree of hardness of the material of the disc-shaped sealing element, which is arranged between the rotating spiral element and the housing body of the spiral compressor, causes increased costs, as the desired hardness can only be obtained through specific cost-intensive materials and/or an additional manufacturing step for hardening the material of the disc-shaped sealing element is required.

In order to reduce these costs, experiments with embodiments of spiral compressors were carried out where the movement clearance of the running sleeves, which causes the wear on the disc-shaped sealing element, was suppressed by gluing or pressing the running sleeves into the recesses. Through this measure, the material abrasion could be reduced due to decreased end face friction. However, the results did not show any improved wear characteristics. The immobilization of the running sleeves in the recesses, for example by gluing in or pressing in, led to an increased radial wear on the inner surfaces of the running sleeves with the associated increased material abrasion and disadvantages for the total system connected thereto.

Therefore, there is still the request for a spiral compressor with which the known disadvantages can be reduced.

SUMMARY

The invention is thus based on the object of stating a spiral compressor which can be produced in an inexpensive manner and enables an increased operating service life through lower material wear.

The object is achieved with a spiral compressor with the features as shown and described herein.

The spiral compressor according to the invention has a stationary spiral element with a stationary spiral wall and a rotating spiral element with a rotating spiral wall which is arranged on a rotatable plate which is engaged with the stationary spiral wall in such a manner that several compression spaces are formed. Furthermore, the spiral compressor according to the invention has a guide means which is provided for guiding the rotating spiral element. The guide means comprises at least two guiding pins which are arranged in a stationary manner and at least two recesses with running sleeves which are inserted therein in a radially movable manner on a back of the rotating spiral element. The guiding pins which are arranged in a stationary manner are received in the running sleeves such that the inner surface of the running sleeves rotates about the circumference of the guiding pins when the rotating spiral element rotates. According to the invention, at least one respective lock is formed in the recesses which prevents an axial protrusion of the running sleeves out of the recesses.

In the sense of the invention, the direction indication "axially" means a direction which is longitudinal or longitudinally parallel to the axis of rotation of the rotating spiral element.

The locks formed in the recesses advantageously restrict the axial movability of the running sleeves, such that an end face friction of the running sleeves on a disc-shaped sealing element arranged between the housing body of the spiral compressor and the back of the rotating spiral element is prevented.

The guiding pins can be arranged in the disc-shaped sealing element in a stationary manner, wherein the disc-shaped sealing element as such is connected to the housing body in a stationary manner. Furthermore, the guiding pins can also be arranged in the housing body, wherein the guiding pins are then received by the running sleeves through the disc-shaped sealing element into the recesses of the rotating spiral element.

According to the concept of the invention, the running sleeves are arranged in the recesses of the rotating spiral element such that they are substantially immobile in the axial direction through the locks. The recesses and the running sleeves are preferably formed in a circular manner. The fit between a recess and the running sleeve inserted into the recess is formed as a clearance fit with a specified clearance, such that a radial movability is ensured which enables the running sleeves to rotate about their own axis in the recesses.

For axial locking of the running sleeves inserted into the recesses, a material deformation can be formed in an edge region of the recesses which is at least selectively directed against an end face of a running sleeve. In doing so, the material deformation, which forms the lock, is preferably formed such that it does not protrude beyond the inner circumference and into the running sleeve. This measure is provided in order to avoid a contact between the material deformation and the guiding pin which is received by the running sleeve.

The material deformation is preferably formed in the edge region of the recesses through a deformation of the material of the rotating spiral element.

According to an embodiment of the spiral compressor according to the invention, the material deformation respectively protrudes into the recess and thus creates a changed shape of the cross-section of the recess. The material deformation can preferably be formed in an edge region of the respective recess.

According to a particularly simple embodiment of the spiral compressor according to the invention, the material deformation can be realized with a stem blow, a notch blow and/or by beading or crimping for the axial locking of the running sleeves inserted into the recesses. For this purpose, corresponding deformation tools and deformation methods can be employed. In doing so, the edge of a recess can be fully beaded, such that a running sleeve inserted into the recess cannot axially protrude out of the recess.

It has been shown that an appropriate axial lock can already be achieved through an individual selective material deformation with a stem blow in the edge region of the recess.

According to a further embodiment of the spiral compressor according to the invention, the recesses can have an undercut at the side of the inner circumference alternatively or additionally to the above embodiments, in which an edge region of the respective inserted running sleeves is deformed by means of beading or crimping. An undercut is preferably realized by an annular groove which is formed at the side of the inner circumference of a recess. In doing so, the material deformation of the running sleeves is configured such that the inserted running sleeves in the recesses can rotate about their axes. Consequently, the deformation of the running sleeves is carried out such that there is sufficient clearance between the recesses and the running sleeves in order to enable a radial movement and a rotation of the running sleeves in the recesses.

The recesses are preferably formed as blind holes. A running sleeve can be arranged in every recess.

According to yet a further embodiment of the spiral compressor, the lock can be formed with a mechanic locking means which is inserted into the recesses. For example, the lock can be formed by inserting a respective ring element into a recess. For this purpose, a respective annular groove into which the ring element is inserted can be formed at the side of the inner circumference of the recesses. In doing so, the ring element can be inserted into an annular groove formed at the side of the inner circumference of the recess in a form-fit manner or by press-fit in a recess. The annular groove which is formed in a respective recess for the arrangement of the ring element at the side of the inner circumference is arranged in the upper region below the edge of the recess. A ring element inserted with a press-fit, which is pressed into the recess, can also be referred to as a press ring. Preferably, such press ring is formed such that its inner diameter is larger than the inner diameter of the running sleeve, the axial protrusion of which out of the recess is prevented by the press ring. Preferably, a respective ring element or a press ring is inserted into a recess in order to restrict the axial movability of the running sleeve inserted into the recess in the sense of the invention.

In an advantageous further development, the recesses can have a cross-section which is enlarged in regions with a landing, wherein the landing serves as a seat for the ring element. The enlarged cross-section is formed on the back of the rotating spiral element in the recesses such that a corresponding ring element which forms the lock can be inserted into the recesses via the back of the rotating spiral element. Due to the landing which is respectively formed in the recesses in this embodiment, which is formed as a ring element seat, a position of the ring element is advantageously given such that a false positioning of the lock can be avoided. Preferably, in this embodiment, a ring element in the shape of a press ring is used, which is inserted into the recess with a press-fit in order to restrict the axial movability of a running sleeve inserted into the recess such that the running sleeve cannot protrude out of a surface of the back of the rotating spiral element.

According to the invention, the lock of the running sleeves inserted into the recesses is respectively formed such that the end face of the running sleeves does not axially protrude beyond the back of the rotating spiral element during operation of the compressor. Consequently, the axial positioning of the running sleeves is advantageously selected such that an end face of a running sleeve does not touch a surface of the disc-shaped sealing element. This also applies to the locks formed for the purpose of the restriction of the axial movement of the running sleeves, which are respectively formed in or inserted into the recesses such that they do not axially protrude beyond the back of the rotating spiral element.

Therefore, the running sleeves are preferably positioned in the recesses such that their end faces do not protrude beyond a plane surface on the back of the rotating spiral element and are preferably located below the plane surface.

The running sleeves and the guiding pins can be formed from a material which has a larger hardness than the material from which the rotating spiral element is formed. Preferably, the guiding pins and the running sleeves are formed from the same material.

The rotating spiral element can advantageously be formed from a cheaper and/or comparably light material such as aluminum.

According to an advantageous embodiment of the spiral compressor according to the invention, it can be provided that the running sleeves and the guiding pins are formed from a hard metal, wherein the rotating spiral element is formed from aluminum. Furthermore, it can be provided that the rotating spiral element is formed from cast iron or steel.

The invention has the advantage that, according to the invention, the running sleeves which are axially locked in the recesses formed in the side of the back wall do not touch the disc-shaped sealing element, such that a wear on the disc-shaped sealing element through the running sleeves is avoided. Accordingly, the material of the disc-shaped sealing element can be formed with a lower hardness or have a lower hardness than the material of the running sleeves. This has a major cost advantage as the manufacturing step of hardening is omitted for the disc-shaped sealing element. Thus, a broader choice of materials is available for forming the disc-shaped sealing element. Thus, much lighter materials can be advantageously used as well. Due to the reduction of the material abrasion, an increased operating service life can be reached with the spiral compressor according to the invention.

BRIEF DESCRIPTION OF DRAWINGS

Further details, features and advantages of embodiments of the invention result from the following description of example embodiments with reference to the accompanying drawings. It is shown.

DESCRIPTION OF AN EMBODIMENT

Figure 1:
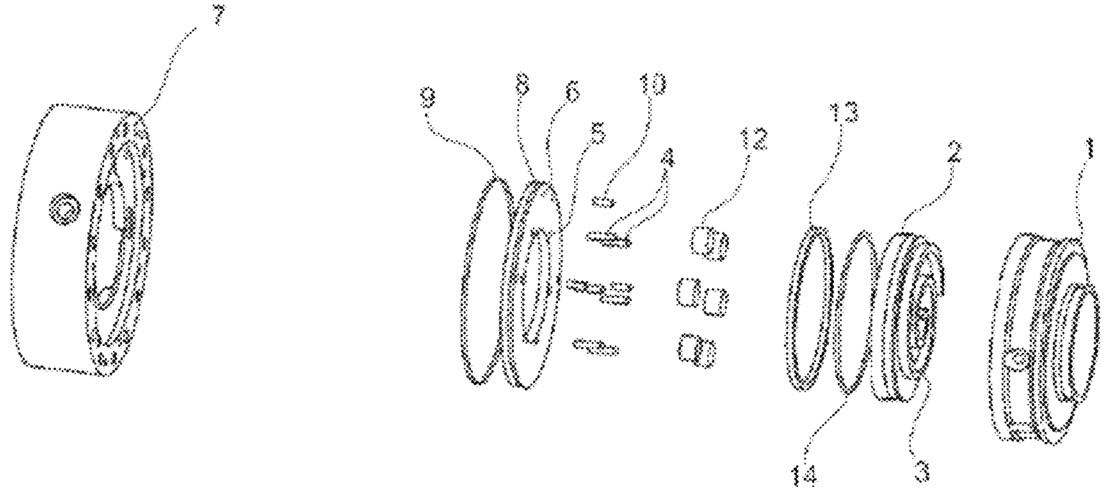
FIG. 1 PRIOR ART
FIG. 1: a schematic exploded representation of a spiral compressor known according to the state of the art.

FIG. 1 shows a schematic exploded representation of a spiral compressor known according to the state of the art. The spiral compressor has a stationary spiral element 1 on which a stationary spiral wall is formed. In the perspective representation of FIG. 1, the stationary spiral wall, which is formed on the stationary spiral element 1, is covered by the circumference of the stationary spiral element 1. A rotating spiral element 2 with a rotating spiral wall 3 arranged on a rotatable plate is arranged opposite the stationary spiral element 1. In the assembled state, the rotating spiral wall 3 is engaged with the stationary spiral wall of the stationary spiral element 1 such that several compression working spaces are formed between the interlocking spiral walls.

For guidance of the rotating spiral element 2, a guide means is provided which has six stationary guiding pins 4 which are received in six recesses 11 formed on a back of the rotating spiral element 2 which are covered in the perspective representation of the rotating spiral element 2. The guiding pins 4 are arranged in a stationary manner in evenly distributed openings 5 of a disc-shaped sealing element 6. The disc-shaped sealing element 6 is arranged between a housing body 7 and the rotating spiral element 2 and has a radially circumferential notch 8 for receiving an O-ring 9 in order to seal the disc-shaped sealing element 6 against the housing body 7. Preferably, the disc-shaped sealing element 6 is not hardened and/or formed from the same material as the housing body 7. The housing body 7 and the disc-shaped sealing element 6 have corresponding openings into which pins 10 for the stationary connection of the disc-shaped sealing element 6 to the housing body 7 are inserted.

According to the state of the art, a respective radially and axially movable running sleeve 12 is inserted into each of the six recesses 11. In the assembled state of the spiral compressor, the axial and the radial clearance of the running sleeves 12 enables a radial and an axial movement of the running sleeves 12 inserted into the recesses 11.

The guiding pins 4 are arranged axially opposite the recesses 11, such that the guiding pins 4 in the assembled state of the spiral compressor are received in the running sleeves 12. In doing so, the inner surface of the running sleeves 12 rotates about the circumference of the guiding pins 4 when the rotating spiral element 2 rotates.

A ring seal 13 with an O-ring 14 is arranged between the rotating spiral element 2 and the disc-shaped sealing element 6.

In contrast to the embodiment of a spiral compressor according to the state of the art shown in FIG. 1, the axial movability of the running sleeves 12 in the spiral compressor according to the invention is restricted by a respective lock formed in the recesses 11 such that they cannot axially protrude out of the recesses 11.

Figure 2:
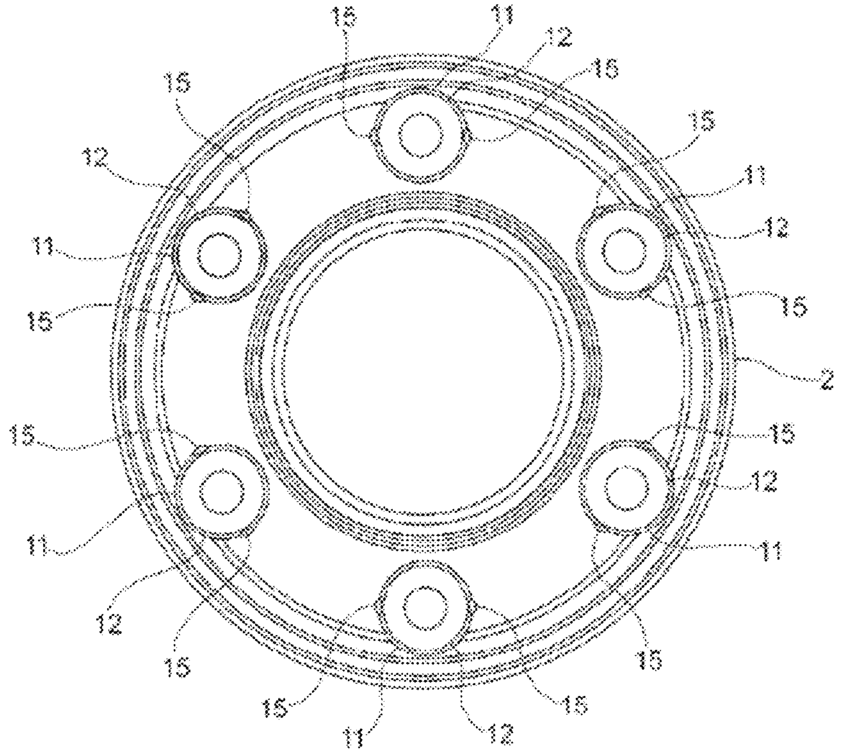
FIG. 2: a schematic representation of an example embodiment of the back of the rotating spiral element of the spiral compressor according to the invention.

FIG. 2 shows a schematic representation of an example embodiment of the back of the rotating spiral element of the spiral compressor according to the invention. On the back of the rotating spiral element 2 which faces the disc-shaped sealing element 6 (not shown), six circular recesses 11 are formed in an equally distributed manner. A running sleeve 12 is inserted into every recess 11, wherein the inner diameters of the recesses 11 are larger than the outer diameters of the running sleeves 12, such that the running sleeves 12 inserted into the recesses 11 have a radial movement clearance. The clearance fit between the running sleeves 12 and the recesses 11 enables a rotation of the running sleeves 12.

The material of the running sleeves 12 is harder than the material from which the rotating spiral element 2 is formed. Preferably, the running sleeves 12 and the guiding pins 4 are formed from a steel, particularly preferred from a hardened steel.

In an edge region of the recesses 11, respectively two material deformations 15 selectively directed against an end face of the running sleeves 12 are formed as a lock which restrict an axial movement of the running sleeves 12 in the recesses 11 such that the running sleeves 12 cannot protrude out of the recesses 11 beyond the back of the rotating spiral element 2. The material deformations 15 are selectively carried out stem strokes, whereby the material of the rotating spiral element 2, which, for example, is aluminum, is deformed from the edge of the recesses 11 to the inner side of the respective recess 11 and thus restricts an axial movement of the running sleeve 12 inserted into the respective recess 11. The selective material deformations 15 are formed such that they do not protrude beyond the end faces of the running sleeves 12 into the running sleeves 12. In the shown example, the selective material deformations 15 respectively protrude 0.25 mm into the recesses 11 and thus block the running sleeves 12 against an axial protrusion out of the recesses 11. The width of the selective material deformations 15 is 0.25 mm. The depth of the selective material deformations 15 is 0.2 mm measured from the upper edge of the recesses 11.

Figure 3A:
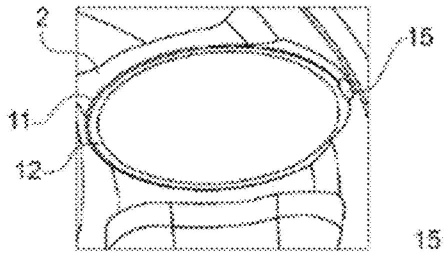
FIGS. 3A to 3C: enlarged schematic representations of example embodiments of recesses of the back of the rotating spiral element of the spiral compressor according to the invention.
Figure 3B:
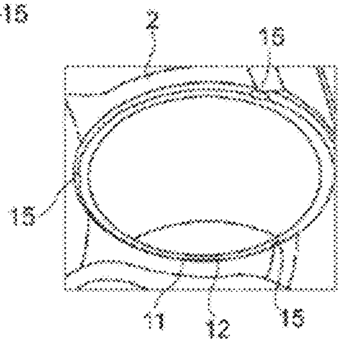
Figure 3C:
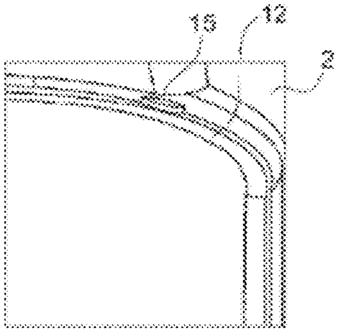

FIGS. 3A to 3C show enlarged schematic representations of example embodiments of recesses 11 of the back of the rotating spiral element 2 of the spiral compressor according to the invention.

FIG. 3A shows an embodiment in which a running sleeve 12 inserted into a recess 11 is locked against an axial protrusion with an individual material deformation 15 of the edge of the recess 15 selectively formed by a stem stroke.

FIG. 3B is a detailed representation of a further embodiment of the solution according to the invention, wherein the axial lock of the running sleeve 12 inserted into the recess 11 of the rotating spiral element 2 is formed with three material deformations 15 evenly formed in a selectively distributed manner about the circumference of the edge of the recess 11.

FIG. 3C shows a further detailed representation of an axial lock formed by material deformation 15 in the edge region of a recess 11 of a running sleeve 12 inserted into the recess 11. The material deformation 15 is formed such that it is directed against the end face of the running sleeve 12 without clamping the running sleeve 12. This makes it possible for the running sleeve 12 in the recess 11 to rotate about its own axis. The material deformation 15 prevents the running sleeve 12 from axially protruding out of the recess beyond the back of the rotating spiral element 2.

Figure 4A:
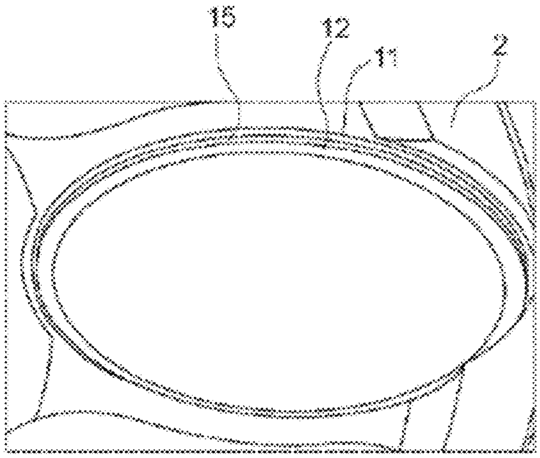
FIGS. 4A to 4B: enlarged schematic representations of a second embodiment of recesses of the back of the rotating spiral element of the spiral compressor according to the invention.
Figure 4B:
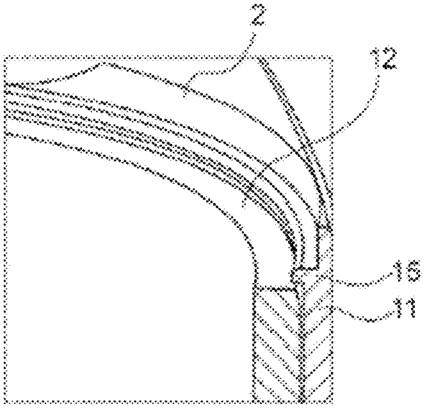

FIGS. 4A to 4B show enlarged schematic representations of a second embodiment of the recesses 11 of the back of the rotating spiral element 2 of the spiral compressor according to the invention. In FIG. 4A, an embodiment of the recess 11 is shown in which the axial lock of the running sleeve 12 inserted into the recess 11 is formed with a material deformation 15 of the edge of the recess 11. The material deformation 15 is obtained by beading the material of the rotating spiral element 2 on the edge of the recess 11 to the interior in the direction of the end face of the running sleeve 12. The beaded edge of the recess 11 protrudes into the recess 11 and thus reduces the cross-section of the recess 11. Due to the reduced cross-section, the running sleeve 12 inserted into the recess 11 is axially locked and cannot protrude out of the recess 11 beyond the back of the rotating spiral element 2.

FIG. 4B shows an enlarged sectional representation of the embodiment of the recess 11 represented in FIG. 4A with beaded edge for axially locking the running sleeve 12 inserted into the recess 11. The material deformation 15, i.e. the beaded edge, protrudes to the inside against the end face of the running sleeve 12 without axially clamping the running sleeve 12. In doing so, the material deformation 15 does not protrude beyond the end face into the running sleeve 12. The diameter of the recess 11 in the region of the beaded edge is smaller than the outer diameter of the running sleeve 12 and greater than the inner diameter of the running sleeve 12.

Figure 5A:
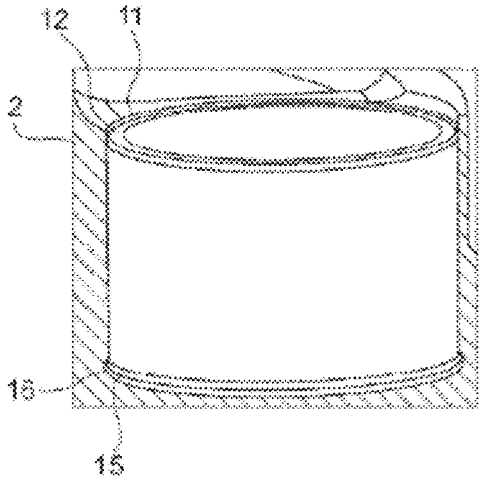
FIGS. 5A to 5B: an enlarged schematic sectional representation of a third embodiment of a recess of the back of the rotating spiral element of the spiral compressor according to the invention and a detailed representation of the third embodiment.
Figure 5B:
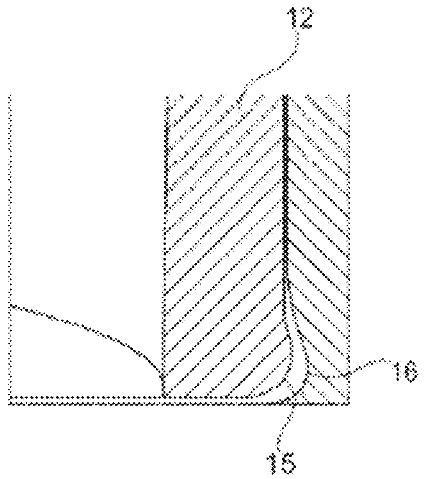

FIGS. 5A to 5B show an enlarged schematic sectional representation of a third embodiment of a recess 11 in the back of the rotating spiral element 2 of the spiral compressor according to the invention, wherein FIG. 5B shows a detailed representation of FIG. 5A.

FIG. 5A shows a section of the recess 11 with a running sleeve 12 inserted into the recess 11. In this third embodiment, the recess 11 has an annular groove 16 formed on the side of the inner circumference, wherein the running sleeve 12 in the region of the annular groove 16 is deformed such that the material of the running sleeve 12 protrudes into the annular groove 16, whereby the running sleeve 12 is axially locked in the recess 11. The material deformation of the running sleeve 12 in the region of the annular groove 16 can be formed by beading or crimping. The annular groove 16, which is formed on the lower edge of a recess 11, serves as an undercut into which the deformed edge region of the running sleeve 12 protrudes without radially clamping the running sleeve 12 in the recess 11. Thus, the deformation of the edge region of the running sleeve 12 is chosen such that a radial clearance of the running sleeve 12 in the recess 11 is guaranteed.

FIG. 5B shows an enlarged sectional representation of the embodiment of the recess 11 with a ring groove 16 represented in FIG. 5A into which deformed material of the running sleeve 12 protrudes in order to axially lock the running sleeve 12 in the recess 11.

Figure 6A:
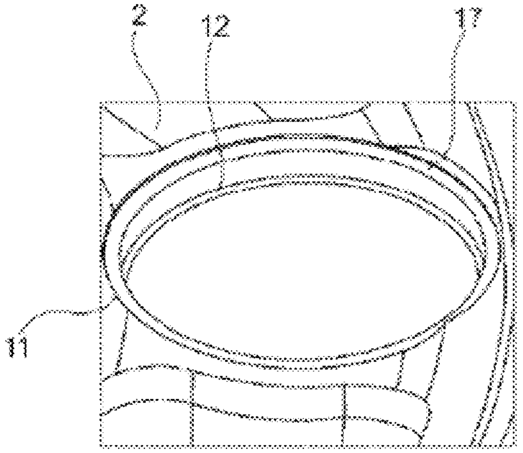
FIGS. 6A to 6B: an enlarged schematic representation of a fourth embodiment of a recess of the back of the rotating spiral element of the spiral compressor according to the invention and a detailed sectional representation of the fourth embodiment.
Figure 6B:
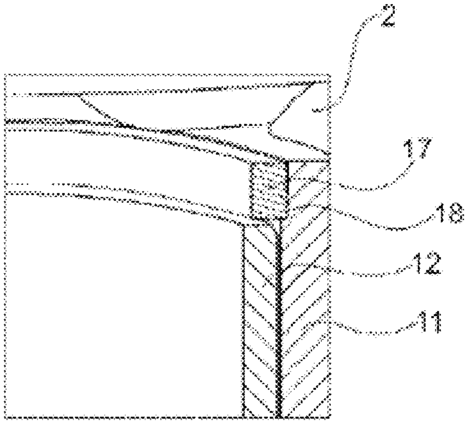

FIGS. 6A to 6B show an enlarged schematic representation of a fourth embodiment of a recess 11 of the back of the rotating spiral element 2 of the spiral compressor according to the invention, wherein FIG. 6B shows a detailed representation of FIG. 6A.

FIG. 6A shows a recess 11 with a running sleeve 12 inserted into the recess 11 and which is axially locked with a press ring 17 inserted into the recess 11. The press ring 17 is inserted into the recess 11 as a press-fit and thus blocks an axial protrusion of the running sleeve 12 out of the recess 11. The inner diameter of the press ring 17 is larger than the inner diameter of the running sleeve 12, such that a touch of the inner surface of the press ring 17 with the outer surface of the guiding pins 4 received into the running sleeves 12 is avoided during operation.

FIG. 6B shows an enlarged sectional representation of the embodiment of the recess 11 represented in FIG. 6A with a press ring 17 for axially locking the running sleeve 12 inserted into the recess 11. The press ring 17 is inserted into the recess 11 such that it is arranged slightly below the surface of the back of the rotating spiral element 2 in order to prevent an end face friction with axially adjacent components, in particular with the disc-shaped sealing element 6. The recesses 11 have a cross-section on the back of the rotating spiral element which is enlarged in regions, with a landing 18 which serves as a press ring seat for the respective inserted press ring 17.

LIST OF REFERENCE NUMERALS

1 stationary spiral element
2 rotating spiral element
3 rotating spiral wall
4 guiding pin
openings
6 disc-shaped sealing element
7 housing body
8 notch
9 O-ring
10 pin
11 recess
12 running sleeve
13 sealing
14 O-ring
15 material deformation
16 annular groove/undercut
17 press ring/ring element
18 landing/press ring seal

The invention claimed is:

1. A spiral compressor comprising:

a stationary spiral element with a stationary spiral wall;

a rotating spiral element with a rotating spiral wall arranged on a rotatable plate and which is engaged with the stationary spiral wall wherein several compression working spaces are formed;

a guide means intended for guiding the rotating spiral element and with at least two guiding pins arranged in a stationary manner; and at least two recesses formed on a back of the rotating spiral element with running sleeves which are inserted therein in a radially movable manner, in which the guiding pins arranged in the stationary manner are received such that the inner surface of the running sleeves, during rotation of the rotating spiral element, rotates about a circumference of the guiding pins, wherein a lock is formed in each of the recesses which prevents an axial protrusion of the running sleeves out of the recesses, wherein for axial locking of the running sleeves inserted into the recesses, a material deformation is formed in an edge region of the recesses which is at least selectively directed against an end face of one of the running sleeves.

2. The spiral compressor according to claim 1, wherein the material deformation in the edge region of the recesses for the axial locking of the running sleeves inserted into the recesses is formed with a stem stroke, a notch stroke and/or by beading or crimping.

3. The spiral compressor according to claim 1, wherein the running sleeves are arranged in the recesses such that end faces do not protrude over a planar surface on the back of the rotating spiral element and are located below the planar surface.

4. The spiral compressor according to claim 1, wherein the running sleeves and the guiding pins are formed from a material which has a larger hardness than a material from which the rotating spiral element is formed.

5. The spiral compressor according to claim 4, wherein the running sleeves and the guiding pins are formed from a hard metal, wherein the rotating spiral element is formed from aluminum.

6. The spiral compressor according to claim 1, wherein a material of a disc-shaped sealing element has a lower hardness than a material of the running sleeves.

7. A spiral compressor comprising:

a stationary spiral element with a stationary spiral wall;

a rotating spiral element with a rotating spiral wall arranged on a rotatable plate and which is engaged with the stationary spiral wall wherein several compression working spaces are formed;

a guide means intended for guiding the rotating spiral element and with at least two guiding pins arranged in a stationary manner; and at least two recesses formed on a back of the rotating spiral element with running sleeves which are inserted therein in a radially movable manner, in which the guiding pins arranged in the stationary manner are received such that the inner surface of the running sleeves, during rotation of the rotating spiral element, rotates about a circumference of the guiding pins, wherein a lock is formed in each of the recesses which prevents an axial protrusion of the running sleeves out of the recesses, wherein the recesses have an undercut at a side of an inner circumference in which an edge region of the inserted running sleeves is deformed by beading or crimping.

8. A spiral compressor comprising:

a stationary spiral element with a stationary spiral wall;

a rotating spiral element with a rotating spiral wall arranged on a rotatable plate and which is engaged with the stationary spiral wall wherein several compression working spaces are formed;

a guide means intended for guiding the rotating spiral element and with at least two guiding pins arranged in a stationary manner; and at least two recesses formed on a back of the rotating spiral element with running sleeves which are inserted therein in a radially movable manner, in which the guiding pins arranged in the stationary manner are received such that the inner surface of the running sleeves, during rotation of the rotating spiral element, rotates about a circumference of the guiding pins, wherein a lock is formed in each of the recesses which prevents an axial protrusion of the running sleeves out of the recesses, wherein the lock is formed with one respective ring element inserted into each of the recesses, wherein in a side of an inner circumference of the recesses, a respective annular groove into which the ring element is inserted is formed.

9. The spiral compressor according to claim 8, wherein the ring element is inserted into each of the recesses through a press-fit.

10. A spiral compressor comprising:

a stationary spiral element with a stationary spiral wall;

a rotating spiral element with a rotating spiral wall arranged on a rotatable plate and which is engaged with the stationary spiral wall wherein several compression working spaces are formed:

a guide means intended for guiding the rotating spiral element and with at least two guiding pins arranged in a stationary manner; and at least two recesses formed on a back of the rotating spiral element with running sleeves which are inserted therein in a radially movable manner, in which the guiding pins arranged in the stationary manner are received such that the inner surface of the running sleeves, during rotation of the rotating spiral element, rotates about a circumference of the guiding pins, wherein a lock is formed in each of the recesses which prevents an axial protrusion of the running sleeves out of the recesses, wherein the lock is formed with one respective ring element inserted into each of the recesses, wherein the recesses have a cross-section which is enlarged in regions with a landing, wherein the landing serves as a seat for the ring element.

* * * * *